Jan. 27, 1942.  R. F. ZERUNEITH  2,271,359
SAFETY CONTROL
Original Filed April 13, 1939  2 Sheets-Sheet 1
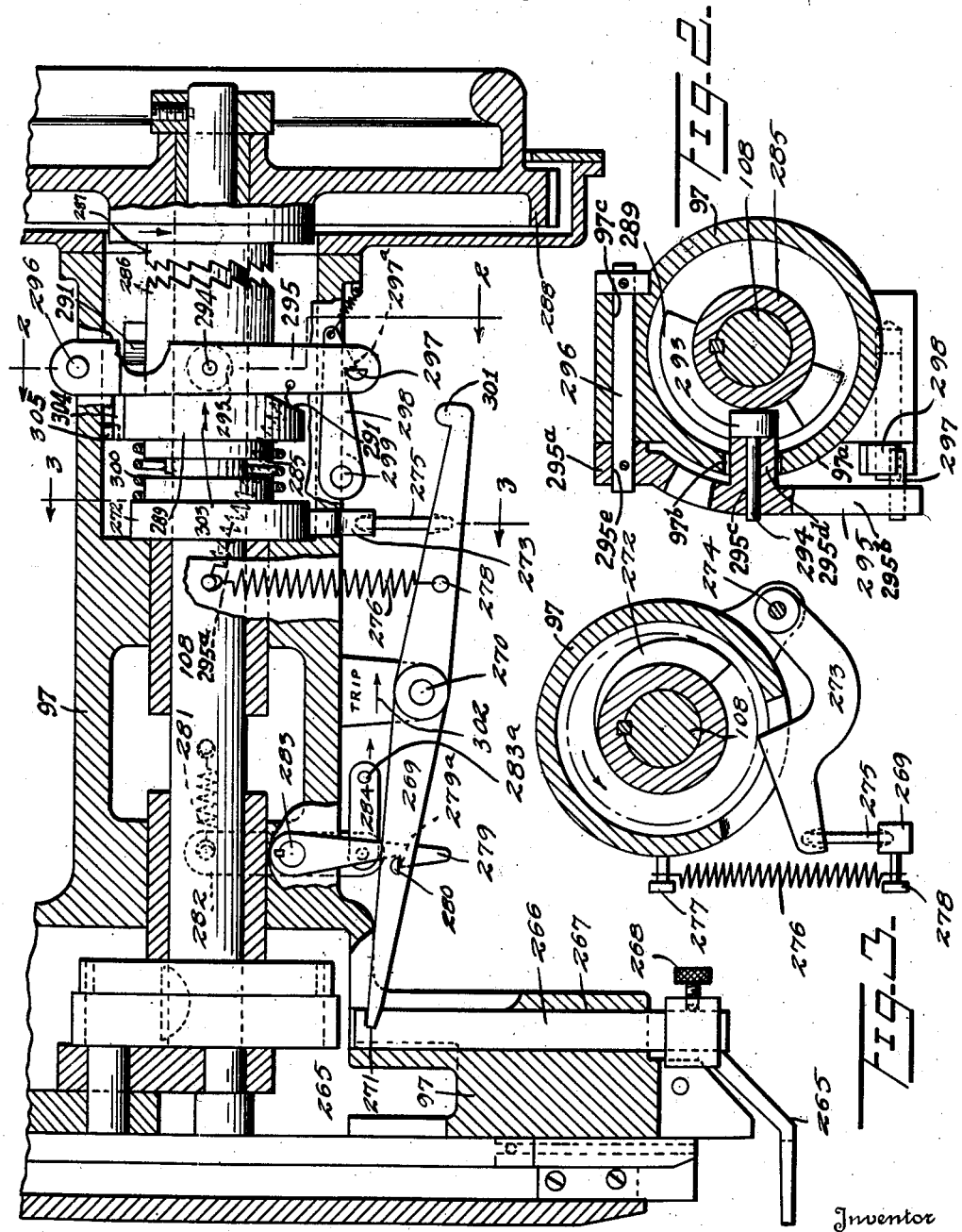
Inventor
R. E. Zeruneith
By Kimmel & Crowell
Attorneys

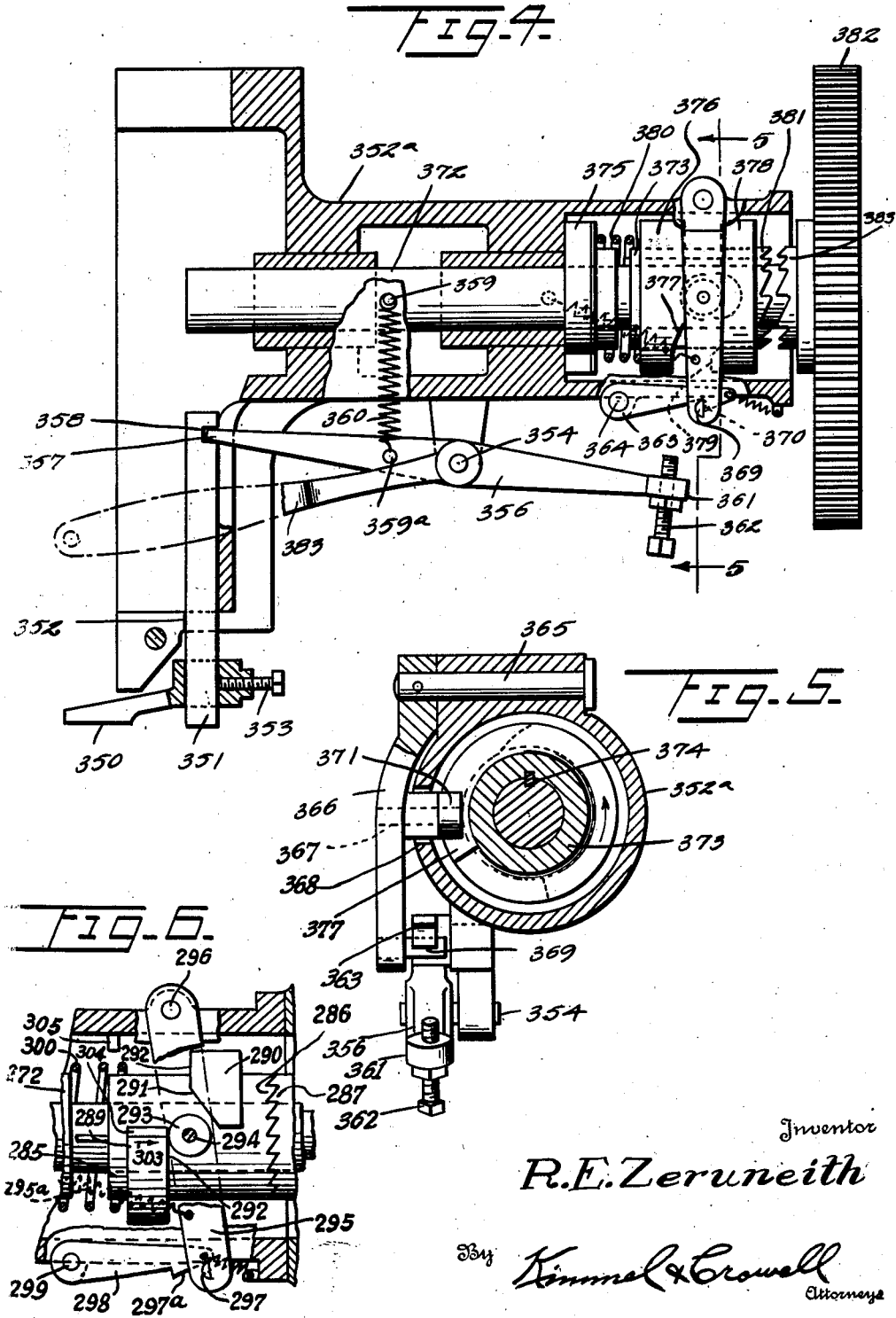
Jan. 27, 1942.　　R. F. ZERUNEITH　　2,271,359
SAFETY CONTROL
Original Filed April 13, 1939　　2 Sheets-Sheet 2
Inventor
R. E. Zeruneith
By Kimmel & Crowell
Attorneys Patented Jan. 27, 1942

2,271,359

UNITED STATES PATENT OFFICE 2,271,359

SAFETY CONTROL

Rudolph E. Zeruneith, New York, N. Y.

Original application April 13, 1939, Serial No. 267,739. Divided and this application August 3, 1939, Serial No. 288,203

17 Claims. (Cl. 192—24)

This invention relates to a safety control for use in connection with power driven machinery in general, but more particularly for employment with wire stitching machines of that type for forming and driving wire staples.

The invention forming the subject matter of this application is a division of my co-pending application, filed April 13, 1939, Serial Number 267,739, and issued as Patent No. 2,171,467.

One of the objects of the invention is to provide, in a manner as hereinafter set forth, a safety control for coupling a driving structure to a driven structure for applying power to the latter, as well as acting as a safeguard for the attendant or operator against accidental injury, such as is commonly caused when inadvertently placing one's hands between relatively approaching power driven machine parts or members.

A further object of the invention is to provide, in a manner as hereinafter set forth, a safety control for the purpose referred to having as an element thereof a controllable latching device therefor.

A further object of the invention is to provide, in a manner as hereinafter set forth, a safety control for connecting and disconnecting a driven element to a driving element to apply power to the driven element and with said control so constructed and arranged relative to said elements to prevent the initial engagement of said elements if the operator's hand or some other obstacle is disposed between relatively movable parts of the machine with which said control is associated, and for immediately disconnecting said elements during the operation of the machine upon the interposition of an obstacle within the danger zone.

A further object of the invention is to provide in a manner as hereinafter set forth, a safety control for clutching a driving element to a driven element to apply power to the latter for moving parts of the machine with which said control is associated and with such control capable of automatically disconnecting said elements during the operation of the machine if the safety control, during its passage through given or defined danger zones, encounters obstacles to arrest its movement.

Further objects of the invention are to provide, in a manner as hereinafter set forth, a safety controlling means for the purpose referred to which is comparatively simple in its construction and arrangement, readily installed in the machine for which it is to be associated, strong, durable, thoroughly efficient in its use and comparatively inexpensive to set up.

Embodying the aforesaid objects and others which may hereinafter appear, the invention consists of the novel construction, combination and arrangement of parts as will be more specifically described and illustrated in the accompanying drawings, wherein are shown embodiments of the invention, but it is to be understood that changes, variations and modifications may be resorted to which fall within the scope of the invention as claimed.

In the drawings:

Figure 1 is a fragmentary view in longitudinal section of a wire stitching machine showing the adaptation therewith of a safety control, in accordance with this invention, Figures 2 and 3 are respectively sections on lines 2—2 and 3—3 of Figure 1, Figure 4 is a longitudinal sectional view of a wire stitching machine showing the adaptation therewith of a modified form of safety control, Figure 5 is a section on line 5—5 of Figure 4, and Figure 6 is a fragmentary view somewhat similar to the right hand portion of Figure 1 and broken away showing the clutch elements in clutching position.

The safety control is illustrated as employed, by way of example, in connection with a wire stitching machine of any type including staple formers and staple drivers, but it is to be understood that the control is for employment with any type of machine for which it may be found applicable.

The form of safety control means shown by Figures 1, 2 and 3 provides for preventing the initial engagement of the driving and driven clutch members, if the operator's hand or some other obstacle is disposed between the relatively approaching parts of the machine and once the machine is operating continuously, for immediately disengaging the clutch upon the interposition of an obstacle within the danger zone, and such means includes an exploring ring guard or shoe 265 which preferably, circumscribes the projected area of the descending machine parts and which is preferably, adjustably mounted on the lower end of a vertically reciprocable rod 266 slidable through the guide hole 267 formed in the casting 97. A set screw 268, which is threadedly engageable with the ring guard member 265 and has its forward tip bearing against the reciprocable rod 266, may be loosened to permit the ring guard member 265 to be vertically adjusted and may thereafter be tightened to fix said guard in its newly adjusted position.

The forward tip of a tiltable releasable lever 269 fulcrumed about a transverse pivot pin 270 fixedly related to the casting 97 projects into a transverse slot 271 formed at the upper end of the reciprocable rod 266. It is to be understood that the lever 269 may be otherwise connected to the rod 266. A cam disc 272 keyed or otherwise fixedly related to the driven shaft 108, coacts with a pivoted follower arm 273 whose fixed end is pivotally secured to the casting 97 by a pivot pin 274, and whose movable end actuates the lever 269 by means of the connecting thrust link 275. The arm 273 intermediate its ends is capable of extending into a tubular casting 97 through an opening in the bottom of the latter.

The rear end of the lever 269 is pulled upwardly by a coiled tension spring 276, hooked at one end to a fixed pin 277 extending from the casting 97 and having its opposite movable end hooked around a pin 278 extending from the lever 269 whereby the pivoted follower arm 273 is maintained in sliding engagement with the cam disc 272 when permitted.

The lever 269 may be restrained from tilting mechanically or by an electrically operated means, and is shown by way of example as being restrained by an electrically operated means consisting of a pivoted solenoid controlled latch 279 having a notch 279ª for receiving a pin 280 extending from the lever 269. A coiled tension spring 281 anchored at one end to the casting 97 and having its opposite movable end secured to a lever 282 fixedly related to said latch 279 through a common shaft 283, serves to constantly urge the latch into an engaging position relative to the lever pin 280. This engagement may be interrupted and the lever 269 freed by energizing an electric solenoid, not shown, whose armature is connected at 283ª to one end of a link 284. The other end of link 284 is connected to the lever 282. The latch 279 is thus disengaged from the lever pin 280 in opposition to the force exerted by the spring 281.

One end of an axially slidable sleeve 285 is provided with a series of clutch teeth 286 which are adapted to engage with and be driven from the juxtaposed clutch teeth 287 extending from a gear 288, operated from a driving means not shown. The sleeve 285 is slidably keyed to shaft 108. The gear 288 revolves about shaft 108 when not clutched with the teeth 286.

A pair of substantially semi-circular segmental oppositely disposed cam plates 289 and 290 are preferably fixedly secured to the slidable and rotatable sleeve 285 on opposite sides thereof, i. e., in approximately 180° out of phase relation, and also in axially spaced relation from each other. Thus, if the sleeve 285 be viewed from one side when rotating, first one of these cam plates will be visible, and then the opposite one will appear. Each of these cam plates 289 and 290 preferably, include a riser surface 291 disposed at their respective leading ends, and a dwell surface 292 which extends from said riser surface 291 up to the trailing end of the cam plate.

The shaft 108, sleeve 285, teeth 287 on gear 288, cam disc 272 and the cam plates are arranged in the tubular casting 97. The latter is horizontally disposed and it is formed in its side 97ª with a slot 97ᵇ intersected lengthwise by the longitudinal median of such side.

A cam roller follower 293, which is preferably journalled on a pin 294 carried by a spring-controlled pivotally suspended vertically disposed oscillatory lever 295, is arranged to be reciprocated to and fro by the cam plates 289 and 290 respectively, as the operative surfaces thereof encounter and sweep past said cam roller follower. The spring for the lever 295 is indicated at 295ª and normally acts to maintain the cam roller follower 293 against the cam plate 289.

The lever 295 includes an inset upper terminal portion 295ª positioned against the top portion of said side 97ª. The remaining portion 295ᵇ of the lever 295 is disposed in offset relation with respect to said side 97ª. The lever 295 depends below the casting 97. The portion 295ᵇ of the lever 295 is formed with an opening 295ᶜ, and on its inner face has an integral inwardly disposed right angular extending tubular extension 295ᵈ which passes through the slot 97ᵇ to between the cam plates or elements 289, 290. The inner face of the extension 295ᵈ forms an inward continuation of the wall of opening 295ᶜ. The upper terminal portion 295ª of lever 295 is formed with an opening 295ᵉ which aligns with an opening 97ᶜ formed in and disposed transversely of the top of casting 97. Arranged in the opening 295ᵉ, fixed to lever 295 and journalled in the opening 97ᶜ is a pivot pin 296, for lever 295 suitably connected to casting 97. The pin 294, on which the cam roller follower 293 is journalled is secured in the opening 295ᶜ and extension 295ᵈ. The lower end of the lever 295 (Figure 1) is provided with a transversely extending latch-engaging pin or keeper 297 which is adapted to coact with the notch 297ª in a generally horizontally disposed spring-controlled pivotable latch 298. One end of this latch 298 is secured to the casting 97 by means of a pivot pin 299 or the like.

When the latch 298 is lifed sufficiently to free the latch engaging pin 297 on the end of the pivotally suspended lever 295, the cam roller 293 will be permitted to reciprocate to and fro as above described. However, if the latch 298 is lowered sufficiently to catch or engage the reciprocating lever pin 297, the pivotable lever 295 will become fixed against movement towards the right, and accordingly, when the riser surface 291 at the leading end of the cam plate 289 sweeps past the roller 293, instead of this roller 293 being moved to the right as formerly, the sleeve 285 will be cammed to the left against the force exerted by the clutch spring 300, thereby disengaging the clutches 286 and 287. In other words, upon the engagement of the cam plate 289 with the cam roller 293, the latter will be moved to the right only if the lower end of the lever 295 on which the roller is mounted, is free to move to the right. Thus, if movement of the lever 295 to the right is obstructed by the latch 298, instead of the roller 293 being moved to the right, the cam plate 289 and its associated sleeve 285 will be moved to the left, thereby effecting a disengagement of the clutch. In the event, that the latch 298 is lifted at the proper time during each cycle to permit the lever 295 to swing to the right, that is to say, if the roller 293 remains unrestrained, the clutch teeth will remain in engagement permitting continuous operation of the machine.

The rear end of the tiltable lever 269 is projected upwardly, as at 301 for engagement with the underside of the roller arresting latch 298, so that each time said rear end of lever 269 is permitted to rise sufficiently for such engagement it will lift said latch 298 clear of the coacting pin 297.

If the solenoid, which controls the movement of the spring-pressed latch 279, is now energized, the connecting link 284 will be pulled to the right in the direction of the arrow 302 causing the lever 282 and its associated latch 279 to pivot in a counter-clockwise direction, in opposition to the force exerted by the tension spring 281 thereby releasing lever 269 for normal operation.

In the normal operation of the machine, on the downward movement of the stapling means the latch releasing lever 269 will be rocked upwardly at its rear end by pull of the spring 276 and the quick drop of the follower 273 from the high portion of the cam 272 to the low portion thereof. During this initial downward movement of the stapling means, the lever 295 is in its foremost position with respect to its lower end which is the position of this lever in Figure 1, the clutch however being engaged and at this time the latch 298 is in a latched position. At the time the stapling means starts downward the cam 272 is moving to a position where the follower 273 will quickly drop from the high portion to the low portion thereof and the rear end of the lever 269 will be quickly raised by the spring 276 to cause the nose 301 to strike the latch 298 and release the same. At the time that the latch 298 is released from the keeper 297, the riser surface of the cam 289 engages the roller 293 to thereby swing the lever 295 rearwardly.

After the stapling means reaches the end of its downward movement the riser surface of the cam 290 will shift the lever to the left with the keeper 297 riding under the bill of the latch 298. When the roller 293 is riding on the dwell face of the cam 290, the latch 298 is in latched position and will remain in this position until the nose 301 again strikes the latch 298 on the next upward movement of the rear end of the lever 269.

In the event an obstruction should be positioned below the guard 265 so as to thereby prevent downward movement of the guard under the action of the spring 276 rocking the lever 269, the nose 301 will be prevented from striking the latch 298 so that this latter latch will remain in latched position and instead of the cam 289 rocking the lever 295 rearwardly as in the normal operation, the riser surface of the cam 289 will pull the cam 289 and the clutch element 286 to the left and disengage the latter, thereby stopping the further downward movement of the stapling means.

If the initial energization of the solenoid be continued, the latch 279 will be held in its inoperative position, and the machine will be permitted to form and drive any desired number of staples into the work, each downstroke of the moving parts being preceded by an exploratory downstroke of the ring guard 265.

Each revolution of the cam plates 289 and 290 will reciprocate the roller follower 293 to and fro, and so long as the reciprocation of this roller is permitted by the periodic lifting of the latch 298, the clutch teeth will remain in engagement with each other. However, should an obstacle be inserted between the descending ring guard 265 and the work, be it after the third, fifth or ninth stitch, or any stitch thereafter, the latch 298 will not be lifted on the downward stroke of the staple forming and driving means, and therefore the pin 297 will engage and remain within the notch of said latch, and the lever 295 and its associated roller follower 293 will accordingly be locked against movement to the right, i. e., in the direction of the arrow 303. Therefore, when the leading end 291 of the cam plate 289 encounters this now fixed roller 293, the cam 289 together with its associated sleeve 285 and driven clutch teeth 286 will be thrust to the left in a direction opposite that indicated by the arrow 303, thereby disengaging the clutch.

A removal of the obstruction between the ring guard 265 and the work will permit the arrested machine to resume its operation and complete only the next stitch, subsequent stitches being dependent upon the continued energization of the solenoid. If the solenoid be deenergized, the latch 279 will immediately be swung into its operative pin engaging position by means of the tension spring 281 and will accordingly engage the pin 280 when the latter is next brought upwardly within range of the notch in said latch, said upward movement being effected by the down thrust exerted on the lever 269 by the rotating cam disc 272 through its associated follower 273 and connecting link 275. The lever 269 being thus restrained, the latch 298 accordingly, will not be lifted by the end 301 thereof, and the roller follower 293 will therefore be locked against movement to the right, resulting in disengagement of the clutch.

A stop member 304 is provided on the rear of the cam plate 289 and coacts with a fixed lug or projection 305 extending from the casting 97, solely when the sleeve 285 is retracted in order to insure that a subsequent stitch will not be formed by virtue of the momentum of the moving parts after the clutch has once been disengaged.

In the modified form of safety clutch control shown by Figures 4 and 5, it is set up by way of example in connection with a wire stitching machine of the staple forming and driving type, such as disclosed by my co-pending application, Serial No. 273,105, filed May 11, 1939. The form of control shown by Figures 4 and 5 is somewhat along the lines of the clutch control disclosed by Figures 1, 2 and 3, but it is manually operated for the purpose of bringing the ring guard or shoe against the work preparatory to driving the stitch or staple. With reference to Figures 4 and 5, a ring guard or shoe is indicated at 350 and is employed for surrounding the exposed ends of the staple forming and driving means of the machine. The shoe 350 is slidably adjustable about a vertical rod 351 slidably mounted in an opening 352 formed in the casting 352ª. A means indicated at 353 coacts with the rod 351 for detachably securing the shoe 350 in its adjusted position. Carried by a pin 354 journalled in the casting 352ª, is a pivoting lever 356 having its end 357 positioned in a notch 358 provided in the upper end of rod 351. Attached at one end to the pin 359 on the casting 352ª and at its other end to a pin 359ª on the lever 356 is a spring 360 for holding shoe 350 and rod 351 in an up position. Adjustably carried by the end 361 of lever 356 is a screw 362 for correlation with a spring-controlled pivoted latch 363 which is mounted at one end on a pivot pin 364 fastened in the casting 352ª. Pivotally supported, as at 365, from the top of the casting 352ª is a depending spring-controlled rocker arm 366 carrying at a point intermediate its ends a fixed pin 367 which extends inwardly from arm 366 through a slot 368 in the casting 352ª. The arm 366 is formed at its lower end with an inwardly extending stop 369 which correlates with a notch 370 formed in the latch 363 to detachably retain the latter in active position to prevent the shifting of arm 366. Mounted on the pin 367 is a cam roller 371.

As shown in Figure 4 the machine comprises a driven structure formed with an operating shaft 372 which is common to the actuatable elements of the machine, a sleeve 373 which is slidably mounted on and keyed to shaft 372, as at 374. A flanged retaining collar 375 is arranged about and fixed to shaft 372 and opposing one end of sleeve 373. A collar 376 is integral with the sleeve 373 in proximity to one end of the latter and is provided with a cam surface 377 at one end thereof. A collar 378 is integral with sleeve 373 and has a cam surface 379 at that end thereof opposing that end of collar 376 having the cam surface 377. The collars 376, 378 are arranged in spaced parallel relation and the cam surfaces 377, 379 on such collars are oppositely disposed. The cam roller 371 is arranged between and alternately wipes the cam surfaces 377, 379.

The collar 375 is spaced from and aligned with collar 376. Interposed between collars 375 and 376 is a controlling spring 380 for shifting the sleeve 373. The other end of the latter is provided with clutching teeth 381. The sleeve 373 is driven from a driving structure including a revoluble gear 382 provided with clutch teeth 383 for interengaging with the teeth 381 to transmit power to sleeve 373 to provide for the operation of shaft 372. The gear 382 is revoluble about shaft 372 until clutched to the teeth 381 and is driven by any suitable means including an electric motor as employed in my application aforesaid.

The lever 356 is to be manually operated to release the latch 363 and for this purpose a lever which may be shifted by hand or foot pressure is employed. The lever which operates manually the lever 356 is indicated at 383 and is shown by way of example as a hand operated one, and fixed at one end to the pin 354. It is to be understood, however, that lever 383 may be attached to lever 356 at any other desirable point thereof.

The control shown by Figures 4 and 5 is operated as follows: The shoe 350 is brought to just above the surface of the work by depressing lever 383, which in turn will depress the lever 356, but the depression of the latter is not to an extent to release the latch 363. In this position of the shoe 350, the work may be moved to the desired position and accurately spotted before the stitch is made. A further downward pressure on the lever 383 will depress lever 356 to an extent to cause the latch 363 to be moved clear of the stop 369, due to the action of the screw 362 engaging with and elevating latch 363 on its pivot; at this point the rocker arm 366 will no longer restrain the spring 380 whereby screw 362 will be shifted to an extent to clutch to and drive from gear 382, and at this time the shaft 372 will be operated and cause the operation of the actuatable elements (Figure 1) of the machine. When pressure on the lever 356 is released, the latch 363 will move in a direction to engage the stop 369. This will occur when the high portion of the cam surface 377 has returned the rocker arm 366 to permit of stop 369 to engage in notch 370. The cam roller 371 has now become fixed and will consequently, due to its coaction with the high portion of the cam surface 377, force sleeve 373 in a direction to move the teeth 381 clear of the teeth 383 and the lever 356 and shoe 350 are then moved to their up position by the spring 360.

The ring guard or shoe is hollow and will conform to the shape of and encompass an article to be stitched or stapled, the article, by way of example, may be five and ten cent merchandise which is to be stitched or stapled to a display card. The arrangement of the guard relative to the article will prevent accidental crushing of the article, as the stitch or staple cannot be driven if the shoe would rest on top of the article or until the shoe has reached its proper level.

It is to be understood that lever 383 may be operated by hand or connected to a foot pedal on the floor.

What I claim is:

1. In a safety control for the purpose set forth, a driven shaft, a driving means for said shaft, a rotatable connector means keyed to and axially slidable on said shaft into and out of interlocking engagement with said driving means for said shaft, means urging said connector means into interlocking engagement with said driving means, a pair of diametrically opposed semi-circular segmental cam elements rigidly associated with said connector means, a vertically disposed oscillatory lever pivotally suspended at its upper end and having its lower end arranged below said elements, a cam follower carried by said lever common to and arranged to be operatively reciprocated by said elements in a direction having a component parallel to the path of the sliding movement of the said connector means, means coacting with the lower end of said lever for latching said lever to prevent the reciprocation of the cam follower to provide for the latter holding the connector means clear of the driving means against the action of the said urging means for the connector means, and a pivotally suspended oppositely movable means for correlation with said latching means and providing at the extent of a complete movement thereof in one of its directions the shifting of the latching means to release said lever for oscillation whereby the cam follower will be reciprocated by the cam elements and said urging means will move the connector means into interlocking engagement with said driving means.

2. In a safety control for the purpose set forth, a driven shaft, a driving means for said shaft, a rotatable connector means keyed to and axially slidable on said shaft into and out of interlocking engagement with said driving means for said shaft, means urging said connector means into interlocking engagement with said driving means, a pair of diametrically opposed semi-circular segmental cam elements rigidly associated with said connector means, a vertically disposed oscillatory lever pivotally suspended at its upper end and having its lower end arranged below said elements, a cam follower carried by said lever common to and arranged to be operatively reciprocated by said elements in a direction having a component parallel to the path of the sliding movement of the said connector means, means coacting with the lower end of said lever for latching said lever to prevent the reciprocation of the cam follower to provide for the latter holding the connector means clear of the driving means against the action of the said urging means for the connector means, and a rockable lever pivotally suspended intermediate its ends for correlation with said latching means and providing at the extent of a complete movement thereof in one of its directions the shifting of the latching means to release said oscillatory lever for oscillation whereby the cam follower will be reciprocated by the cam elements and said urging means will move the connector means into interlocking engagement with said driving means.

3. In a safety control for the purpose set forth, a driven shaft, a driving means for said shaft, a rotatable connector means keyed to and axially slidable on said shaft into and out of interlocking engagement with said driving means for said shaft, means urging said connector means into interlocking engagement with said driving means, a pair of diametrically opposed semicircular segmental cam elements rigidly associated with said connector means, a vertically disposed oscillatory lever pivotally suspended at its upper end and having its lower end arranged below said elements, a cam follower carried by said lever common to and arranged to be operatively reciprocated by said elements in a direction having a component parallel to the path of the sliding movement of the said connector means, means coacting with the lower end of said lever for latching said lever to prevent the reciprocation of the cam follower to provide for the latter holding the connector means clear of the driving means against the action of the said urging means for the connector means, and a spring controlled rockable lever pivotally suspended intermediate its ends for correlation with said latching means and having means at one end thereof providing at the extent of a complete movement of the rockable lever in one of its directions the shifting of the latching means to release said oscillatory lever for oscillation whereby the cam follower will be reciprocated by the cam elements and said urging means will move the connector means into interlocking engagement with said driving means.

4. In a safety control for the purpose set forth, a driven shaft, a driving means for said shaft, a rotatable connector means keyed to and axially slidable on said shaft into and out of interlocking engagement with said driving means for said shaft, means urging said connector means into interlocking engagement with said driving means, a pair of diametrically opposed semicircular segmental cam elements rigidly associated with said connector means, a vertically disposed oscillatory lever pivotally suspended at its upper end and having its lower end arranged below said elements, a cam follower carried by said lever common to and arranged to be operatively reciprocated by said elements in a direction having a component parallel to the path of the sliding movement of the said connector means, means coacting with the lower end of said lever for latching said lever to prevent the reciprocation of the cam follower to provide for the latter holding the connector means clear of the driving means against the action of the said urging means for the connector means, a rockable lever pivotally suspended intermediate its ends for correlation with said latching means and having means at one end thereof providing at the extent of a complete movement of said rockable lever in one of its directions the shifting of the latching means to release said oscillatory lever for oscillation whereby the cam follower will be reciprocated by the cam elements and said urging means will move the connector means into interlocking engagement with said driving means, means for normally latching said rockable lever at an inclination to the horizontal, and means for releasing the latching means for said rockable lever.

5. In a safety control for the purpose set forth, a driven shaft, a driving means for said shaft, a rotatable connector means keyed to and axially slidable on said shaft into and out of interlocking engagement with said driving means for said shaft, means urging said connector means into interlocking engagement with said driving means, a pair of diametrically opposed semi-circular segmental cam elements rigidly associated with said connector means, a vertically disposed oscillatory lever pivotally suspended at its upper end and having its lower end arranged below said elements, a cam follower carried by said lever common to and arranged to be operatively reciprocated by said elements in a direction having a component parallel to the path of the sliding movement of the said connector means, means coacting with the lower end of said lever for latching said lever to prevent the reciprocation of the cam follower to provide for the latter holding the connector means clear of the driving means against the action of the said urging means for the connector means, a spring controlled rockable lever pivotally suspended intermediate its ends for correlation with said latching means and upstanding means at one end thereof providing at the extent of a complete movement of said rockable lever in one of its directions the shifting of the latching means to release said oscillatory lever for oscillation whereby the cam follower will be reciprocated by the cam elements and said urging means will move the connector means into interlocking engagement with said driving means, means for normally latching said rockable lever at an inclination to the horizontal, and means for releasing the latching means for said rockable lever.

6. In a safety control for the purpose set forth, a driven shaft, a driving means for said shaft, a rotatable connector means keyed to and axially slidable on said shaft into and out of interlocking engagement with said driving means for said shaft, means urging said connector means into operative engagement with said driving means, a pair of diametrically opposed revolving semi-circular segmental cam elements rigidly associated with said connector means, a cam follower means arranged to be operatively reciprocated by said elements in a direction having a component parallel to the path of the sliding movement of the said connector means, means for latching said cam follower means from movement to provide for it holding the connector means clear of the driving means against the action of the said urging means for the connector means, a rockable lever pivotally suspended intermediate its ends for correlation with said latching means and providing at the extent of a complete movement thereof in one of its directions of movement the actuation of said latching means to release said cam follower means for reciprocation by said cam elements whereby said urging means will move the connector means into operative engagement with said driving means, means for shifting said rockable lever in the said one direction of its movement, a cam disc adapted to be fixedly related to the shaft forwardly of said connector means, a pivoted follower arm correlated with said disc, and a thrust link operated from said arm for moving said rockable lever in the other direction of its movement.

7. In a safety control for the purpose set forth, a driven shaft, a driving means for said shaft, a rotatable connector means keyed to and axially slidable on said shaft into and out of interlocking engagement with said driving means for said shaft, means urging said connector means into operative engagement with said driving means, a pair of diametrically opposed revolving semicircular segmental cam elements rigidly associated with said connector means, a cam follower means arranged to be operatively reciprocated by said elements in a direction having a component parallel to the path of the sliding movement of the said connector means, means for latching said cam follower means from movement to provide for it holding the connector means clear of the driving means against the action of the said urging means for the connector means, a rockable lever pivotally suspended intermediate its ends for correlation with said latching means and providing at the extent of a complete movement thereof in one of its directions of movement the actuation of said latching means to release said cam follower means for reciprocation by said cam elements whereby said urging means will move the connector means into operative engagement with said driving means, means for shifting said rockable lever in the said one direction of its movement, and means adapted to be operated from the drive shaft and correlated with said rockable lever for moving the latter in the other direction of its movement.

8. The invention as set forth in claim 1 having a housing for said connector-means, shaft, cam elements and driving means formed with a slot, said oscillatory lever being pivoted at its upper end to the top of and arranged exteriorly of the housing, said oscillatory lever having an angularly disposed part intermediate its ends extending through said slot into the housing, and said part rotatably supporting said cam-follower means relative to said cam elements.

9. In a safety control for the purpose set forth, a driven shaft, a driving means for said shaft, a rotatable connector-means keyed to and axially slidable on said shaft into and out of interlocking engagement with said driving means, means urging said connector-means into interlocking engagement with said driving means, a pair of diametrically opposed spaced semi-circular cam elements rigidly associated with said connector-means, a spring controlled pivotally suspended oscillatory lever arranged adjacent to and depending below said elements, a rotatable cam-follower means mounted on said lever intermediate the ends of the latter, common to and arranged to be operatively reciprocated by said elements in a direction having a component parallel to the path of the sliding movement of said connector-means, a keeper on the lower end of said lever, a spring controlled latching member coacting with said keeper for latching said lever to thereby hold said cam-follower means from movement to provide for it holding said connector-means clear of said driving means against the action of said urging means, and an oppositely movable pivotally suspended releasing lever having one end provided with means correlated with said latching member and providing at the extent of a complete movement of the releasing lever in one of its directions for the means of said end shifting said latching member in a direction to release said oscillating lever to thereby permit of the reciprocation of said cam-follower means by said cam elements whereby said urging means will move said connector-means into interlocking engagement with said driving means.

10. The invention as set forth by claim 9 having a housing for said connector-means, shaft, cam elements and driving means formed with a slot, said oscillatory lever being pivoted at its upper end to the top arranged exteriorly of and depending from said housing, said oscillatory lever having an angularly disposed part intermediate its ends extending through said slot into the housing, the said part rotatably supporting said cam-follower means relative to said cam elements.

11. In a safety control for the purpose set forth, a driven shaft, a driving means for said shaft, a rotatable connector-means keyed to and axially slidable on said shaft into and out of interlocking engagement with said driving means, means urging said connector-means into interlocking engagement with said driving means, a pair of diametrically opposed spaced semi-circular cam elements rigidly associated with said connector-means, a spring controlled pivotally suspended oscillatory lever arranged adjacent to and depending below said elements, a rotatable cam-follower means mounted on said lever intermediate the ends of the latter, common to and arranged to be operatively reciprocated by said elements in a direction having a component parallel to the path of the sliding movement of said connector-means, a keeper on the lower end of said lever, a spring controlled latching member coacting with said keeper for latching said lever to thereby hold said cam-follower means from movement to provide for it holding said connector-means clear of said driving means against the action of said urging means, an oppositely movable pivotally suspended releasing lever having one end provided with means correlated with said latching member and providing at the extent of a complete movement of the releasing lever in one of its directions for the means on said end shifting said latching member in a direction to release said oscillatory lever to thereby permit of the reciprocation of said cam-follower means by said cam elements whereby said urging means will move said connector-means into interlocking engagement with said driving means, a cam ring fixed to and bodily revoluble with said shaft, and a pivotally supported means operated from said cam ring for moving said releasing lever in the other one of its directions of movement to clear said latching member.

12. The invention as set forth in claim 1 having combined therewith a cam ring fixed to and bodily revoluble with said shaft, and a pivotally supported means operated from said cam ring for moving said pivotally suspended oppositely movable means in the other one of its directions of movement to clear said latching means.

13. The invention as set forth by claim 9 having said means at the said one end of said releasing lever consisting of an upwardly extending projection integral with such end.

14. The invention as set forth by claim 9 having said means at the said one end of said releasing lever consisting of a vertically adjustable member having threaded engagement with the said one end.

15. In a safety control for a reciprocable structure having a guard means correlated therewith; a rotatable driven shaft for said structure, a drive shaft, a clutch element carried by said drive shaft, a second clutch element slidably carried by said driven shaft, yieldable means constantly urging said second clutch element into clutching engagement with said first clutch element, a pair of diametrically opposed cam elements fixedly carried by said second clutch element and spaced apart lengthwise of the latter, a suspended oscillatory lever, a cam follower carried by said lever and alternately engageable with said cam elements upon rotation of said second clutch element, a spring-pressed lever locking latch engageable with said lever upon rocking of the latter in one direction by one of said cam elements, a pivoted spring-pressed releasing lever including a part engageable with said latch upon rocking of said releasing lever in one direction for swinging said latch to a released position upon initial downward movement of said structure, cam means carried by said driven shaft operatively connected with said releasing lever for releasing the latter during the initial downward movement of said operating member, said releasing lever being connected to said guard means and engagement of said guard means with an obstruction beneath said structure holding said releasing lever against rocking whereby said latch will be maintained in latched position and said first lever will also be held in locked position, further rotation of said second clutch element effecting movement thereof under the action of the other of said cam elements to thereby shift said second clutch element to a declutching position.

16. The invention as set forth by claim 15 having said part of said releasing lever consisting of an upwardly extending projection integral with one end of such lever.

17. The invention as set forth by claim 15 having said part of said releasing lever consisting of a vertically adjustable member threadedly engaging with such lever at one end of the latter.

RUDOLPH E. ZERUNEITH.